United States Patent
Morgan

(10) Patent No.: US 12,393,676 B1
(45) Date of Patent: Aug. 19, 2025

(54) SECURE CODE EXECUTION FOR ARTIFICIAL INTELLIGENCE AGENTS

(71) Applicant: Airia LLC, Alpharetta, GA (US)

(72) Inventor: Andrew Morgan, Dublin (IE)

(73) Assignee: Airia LLC, Alpharetta, GA (US)

( * ) Notice: Subject to any disclaimer, the term of this patent is extended or adjusted under 35 U.S.C. 154(b) by 0 days.

(21) Appl. No.: 19/086,645

(22) Filed: Mar. 21, 2025

(51) Int. Cl.
*G06F 21/53* (2013.01)
*G06F 21/56* (2013.01)
*G06F 21/60* (2013.01)

(52) U.S. Cl.
CPC ............ *G06F 21/53* (2013.01); *G06F 21/563* (2013.01); *G06F 21/606* (2013.01)

(58) Field of Classification Search
CPC ......... G06F 21/53; G06F 21/563; G06F 21/60
See application file for complete search history.

(56) References Cited

U.S. PATENT DOCUMENTS

| | | | | |
|---|---|---|---|---|
| 2011/0029341 A1* | 2/2011 | Muse | ................... | G06Q 10/063 705/7.11 |
| 2018/0032384 A1* | 2/2018 | Chheda | ................... | G06F 9/547 |
| 2018/0067790 A1* | 3/2018 | Chheda | ................... | G06F 9/547 |
| 2021/0240818 A1* | 8/2021 | Seksenov | .............. | G06F 16/986 |
| 2024/0098100 A1* | 3/2024 | Lal | ...................... | H04L 63/1433 |
| 2024/0220619 A1* | 7/2024 | Divakaran | ............ | G06F 21/565 |
| 2024/0241763 A1* | 7/2024 | Beveridge | ............. | G06F 9/5072 |

OTHER PUBLICATIONS

Denham et al., "Ransomware and Malware Sandboxing", Oct. 2022, IEEE 13th Annual Ubiquitous Computing, Electronics & Mobile Communication Conference, pp. 0173-0179 (Year: 2022).*
Benselloua et al., "Effective Malicious PowerShell Scripts Detection using DistilBERT", Dec. 2023, IEEE Afro-Mediterranean Conference on Artificial Intelligence, pp. 1-6 (Year: 2023)*

* cited by examiner

*Primary Examiner* — Kenneth W Chang
(74) *Attorney, Agent, or Firm* — Clayton, McKay & Bailey, PC

(57) ABSTRACT

The system securely executes code blocks for artificial intelligence (AI) agents by creating nano sandboxes in which customer scripts execute. An input is received that causes an agent executor to execute an AI agent. The AI agent can be defined to include a code block for executing a customer script. To securely execute the customer script while preventing unauthorized access on an AI platform, the agent executor can create a nano sandbox in which the customer script of the code block will execute using read-only system resources and files. The agent executor can wrap the customer script in logic that seeds an input variable from a file in the nano sandbox. Execution results in writing to an output file, from which an output is retrieved and returned to the user device. The nano sandbox can then be destroyed.

20 Claims, 8 Drawing Sheets

SECURE CODE EXECUTION FOR ARTIFICIAL INTELLIGENCE AGENTS

BACKGROUND

Artificial intelligence ("AI") systems and, more specifically, AI agents can allow users to perform tasks or retrieve information in ways not previously available. Enterprises are attempting to utilize AI agents to create a more efficient workforce. However, specific functionality needs vary greatly across different enterprises and even between different users within an enterprise.

It is currently risky to allow customers to include their own scripts (e.g., code) for execution as part of an AI agent workflow. For example, an AI platform may allow a customer to customize an AI agent. But the customer is unable to add their own scripts that execute as part of running the AI agent, because doing so would normally expose the AI platform to a variety of security risks. The security risks can include manipulation of system resources, root access, changing of user privileges and the like. Without creative security measures, a customer script, such as Python script, might access system resources or other private resources of the AI platform. Parent processes and even data of other customers could become available to a malicious script. Likewise, a script could alter libraries or tools that are then used by other AI agents or customers. These sorts of security issues exist whether the code block executes on local or third-party infrastructure.

It is no surprise then that AI platforms have so far not provided easy ways for customers to include code blocks within workflows of AI agents. Instead, customized AI agents have been limited to more traditional execution flows that take advantage of existing AI models, such as large language models ("LLMs"), and perhaps datasets related to a customer.

As a result, new systems and methods are needed for securely executing code blocks for managed AI agents.

SUMMARY

Examples described herein include systems and methods for securely executing code blocks for AI agents. For example, a customer or other user can define an AI agent to include a code block that executes as one of multiple agent objects of the AI agent. The agent objects can include datasets for vector database searches, AI models, prompt packages, code blocks, and tools. The user can define the AI agent on a user interface ("UI") provided by an AI platform. The UI allows the user to select various agent objects and arrange them in a connected workflow onscreen. The AI agent can also be managed, such that the treatment of code blocks can change based on the code itself, the tenant, or attributes or permissions of the user. The AI agent can also be referred to as an AI assistant, which typically are user-facing, or an AI pipeline, which are not necessarily user-facing but can be.

The code block agent object can allow the user to insert custom code, referred to as a customer script, into the AI agent. The customer script can be written in a language supported by the AI platform, such as in Python. The customer script can receive an input from either the user (through a client device) or from the output of a prior agent object of the AI agent. The systems and methods discussed herein allow for executing the customer script of the code block without exposing the AI platform to security risks.

An agent executor can receive an input from a client device. The agent executor can be one or more processes that orchestrate execution of agent objects used to facilitate the AI agent functionality. The agent executor can include or operate with a rules engine that can derive permissions for a user, data chunks, and for results from the AI agent that are then stored for future use. The rules engine can also be one or more processes. The agent executor can be located at an AI platform, or a gateway server. The gateway server can act as a proxy that communicates with the AI platform. The agent executor selects between various agent objects to execute based on user criteria, query context, and management policies. The agent executor can include a rules engine for selecting from available agent objects based on user permissions and code block access privileges.

The input can include a query or some other text that an AI agent can act on. The input can include files as well, which may or may not include text. The AI agent input can also include a user ID and an AI endpoint key, such as an application programing interface ("API") key, used to validate the input. The agent executor can utilize a rules engine in executing agent objects of the AI agent. The agent objects can be defined in a manifest that the AI platform updates based on which agent objects are connected together by a user in designing the AI agent. Example agent objects include vector database searches, requests to AI models, prompt packages, and code execution. The gateway can be a proxy server that receives inputs from a client application and then executes an AI agent that corresponds to the input. The agent executor can follow the manifest in executing the agent objects. For example, with a dataset object, the agent executor can cause the user input to be vectorized for comparison against one or more vector databases of the dataset in a semantic search. For example, an enterprise search can access databases associated with different applications or even different AI services.

A code block is another type of agent object that can execute as part of the AI agent. The code block can be associated with a customer script. To include a code block in the AI agent, a user of an AI platform can make selections on a UI to connect the code block to other agent objects, such as the dataset or an AI model. The code block can receive an input, such as the user input or an output of a prior agent object, just depending on how the user lays out the flow of the AI agent. The input to the code block can be used during execution of the script associated with the code block. The exact functionality of the code block is defined by the customer script. The customer script is selected or entered by the user (e.g., an administrator for a customer of the AI platform). The AI platform can provide selectable customer scripts for various stored functions. However, the AI platform can also allow free-form entry of custom scripts by the customer. This can allow the customer to create code blocks that do specific functions or tasks. The customer script can be a Python script or any other type of programming code.

The code block can include a customer script, such as a Python script. This can allow customers to include their own custom code for execution as part of the AI agent. However, to ensure that the customer code does not cause problems on the AI platform, the AI platform can employ a Python toolkit that creates a secure environment for code execution. Although this application refers specifically to Python, other types of code or scripts can also be securely executed in some examples. The Python toolkit can include a set of Python-based tools or functionalities that interact with the agent executor and AI platform via an API. One or more processes can carry out the functions of the Python toolkit.

To execute a code block, the agent executor can invoke the Python toolkit using a web service, such as FastAPI. The Python toolkit can allow the agent executor to create a sandboxed environment, called a nano sandbox. A nano sandbox can be a lightweight, minimalistic security sandbox designed to execute untrusted code in a highly restricted environment. Unlike full-fledged containerized solutions (such as Docker or Firejail), nano sandboxes can have lower overhead, simplicity, and fine-grained access control.

The nano sandbox can be created through use of bubblewrap, a Linux process. Bubblewrap (bwrap) can be used in Linux to create isolated execution environments. The nano sandbox can execute untrusted code securely, such as executing Python scripts in a restricted environment. The Python toolkit can bind system directories to the nano sandbox as read-only, isolate system resources, control network access, and otherwise strictly limit environment variables. The terms bind and mount are used synonymously, with the understanding that the read-only resources are can be bound with a bind command or mounted with the mount command and both are considered a bind and a mount.

The nano sandboxes can be created inside of a privileged container that runs in Kubernetes. Inside of the privileged container, the web service requests can be generated. The web service request creates a nano sandbox and can do so using bubblewrap. Using bubblewrap within the context of a web request, the nano sandboxes can be isolated environments in the kernel with read-only system resources, such as directories, libraries, and files needed to execute the customer script. Binding read-only system resources can refer to binding a read-only file system, system directory, system library, or system file.

In this restricted environment, a subprocess can execute the customer script, such as Python code. The customer script can be wrapped with input and customer data variables. The input variables can be the user input or an output from any previous step (i.e., agent object execution) of the AI agent. For example, if an LLM step occurred prior to the code block, the output from the LLM can be fed to the code block, such as for sanitization of the LLM output. The exact input to the code block is up to the user who designs the AI agent and depends on the context of the AI agent. The input can then be used in executing the customer script. A read-only input file is placed in the nano sandbox, and the input variable is read from the file. Likewise, other information, such as customer data, can be placed in read-only files and read into variables for execution with the customer script.

Customer data can include things such as user name, user ID, email or contact information, role, group identifier, tenant ID, access permissions, previous queries and conversations, recent activity, session history, preferred language and communication style, purchase history, device information, user goals or tasks, feedback, ratings, or user-supplied files. This sort of customer data can be relevant in a script to personalize an output or to change how a script manipulates an input.

The customer script can also be wrapped with functionality to write an output object containing the output of the customer script. The agent executor can retrieve the output from the output object by populating an output variable. Then the nano sandbox can be destroyed, such as when the web service request is completed. The nano sandbox can be wiped from memory automatically. For example, when the process inside of the bubblewrap exits, the nano sandbox is automatically destroyed. This can include automatic teardown, which any mount points, namespaces, and temporary modifications being cleaned up. In one example, destroying the nano sandbox can include manual cleanup if a process inside of the nano sandbox does not terminate. Another process outside of the nano sandbox can monitor for this scenario and kill the ongoing process, such as with a kill <[Process ID]> command. The API can include functions for inspecting running processes inside of the nano sandbox, or a command such as ps or lsns can be used.

This process can allow for executing customer code without compromising data security and other functionality of the AI platform. Hundreds or thousands of customers can simultaneously execute their own code blocks without any customer getting into another customer's nano sandbox. This allows for creation of more robust AI agents that incorporate customer scripts that can be freely defined and developed by customers of the AI platform. This system allows for scalable and efficient AI agent execution while ensuring compliance with security and access control policies. The system balances performance, cost, and access control.

The examples summarized above can each be incorporated into a physical non-transitory, computer-readable medium having instructions that, when executed by a processor associated with a computing device, cause the processor to perform the stages described. The physical non-transitory, computer-readable medium can be multiple different storage mediums containing different portions of the instructions. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

An AI agent can include any workflow that utilizes an AI model or AI service, which are types of agent objects. An AI platform can allow administrative users to define the AI agents by connecting agent objects in an overall workflow that includes an input and an output. A deployed AI agent can receive inputs and produce outputs according to the workflow defined by the connected agent objects. For example, an enterprise can provide job-specific AI agents that allow employees to quickly automate certain tasks or answer questions related to their job. An agent executor can execute the various agent objects of the AI agent to complete the workflow defined by the AI agent.

A code block is one type of agent object that can be included in the AI agent for execution as part of the overall workflow. The code block can be a script, such as a Python script. This can allow customers to include their own custom code for execution as part of the AI agent. However, to ensure that the customer code does not cause problems on the AI platform, the AI platform can employ a Python toolkit that ensures a secure environment for code execution. Although this application refers specifically to Python, other types of code or scripts can also be securely executed in some examples.

Figure 1:
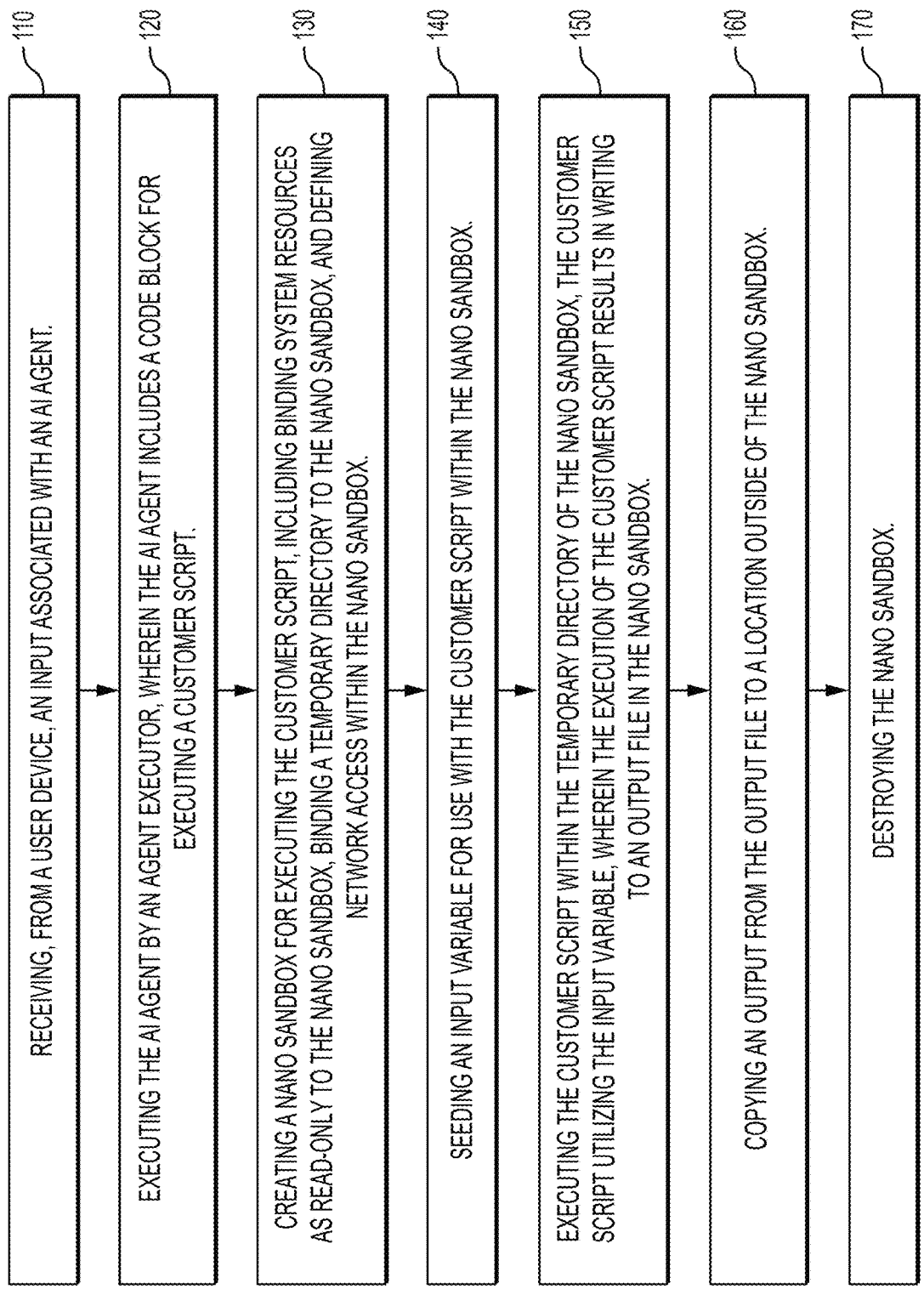
FIG. 1 is a flowchart of an example method for securely executing a code block of an AI agent.

FIG. 1 is a flowchart of an example method for securely executing a code block of an AI agent. At stage 110, an agent executor can receive, from a user device, an input associated with an AI agent. The agent executor can execute at an AI platform or some other location, such as at a gateway server. The location can be specified by an endpoint used by a client application at the user device, in an example. The client application can communicate with the AI agent based on utilizing a key at the endpoint.

The AI agent can support job-specific or general tasks. For example, the AI agent can ingest documents for use in answering user questions or creating work product (i.e., an additional resource). For example, a user can ask the AI agent to summarize everything the user has worked on in the last few months, and the AI agent can output this summary. This request can be an input, received by the agent executor from the user device. The agent executor can the execute the AI agent according to the manifest, which specifies which agent objects to execute in which order. The agent objects can do various things with the input or outputs of other prior agent objects. For example, the agent executor can cause the outputted summary to be stored in the vector database as its own resource with its own derived permission for access by the user or other users.

The AI agent itself can be designed on the AI platform to operate according to a set of connected agent objects. One such type of agent object is a code block. The code block can be assigned one or more customer scripts, which can be code that gets executing during operation of the AI agent.

The execution of the AI agent by the agent executor can be predicated on validating the user, such as through receiving user credentials or through receiving the appropriate key at the endpoint.

At stage 120, the agent executor can execute the AI agent, which can include a code block with a customer script. The customer script can be pre-associated with the code block. For example, in designing or modifying the AI agent by using the UI of the AI platform, a customer can select or type a Python script into a window for association with the code block agent object. The code block can be connected to other agent objects such that the code block is included in the manifest of the AI agent.

The agent manifest can keep track of specific versions of the agent objects and their position coordinates on the UI. The manifest can track dependencies, which include prerequisite events and resources that are needed prior to executing one or more stages of the AI agent (e.g., prior to executing one or more agent objects). A server of the AI platform can cause the agent manifest to be validated against dependency rules for the agent objects. The dependency rules can vary for different agent objects. For example, a language model might require a particular security-related prompt package and a particular library for use as part of pre or post processing. A search of a dataset can require prior ingestion and vectorization of the dataset. The code block can require loading of certain libraries, system resources, files, and network functionality prior to operating. Dependencies can be used by the agent executor in carrying out execution of the agent objects. For example, the agent executor can wait for dataset ingestion prior to executing a next agent object, such as a code block that relies on an output from the dataset as an input to associated customer script.

The system can receive further inputs in the UI to arrange the selected agent objects in an AI agent. For example, the agent objects can be dragged into position and connected to one another. The connection causes an execution linking between the selected dataset object and code block to be established. The UI visually represents the established execution linking between the agent objects. The system can generate an agent manifest file that stores the arrangement of agent objects in the AI agent. When the manifest is validated, the AI agent is displayed as an execution flow within the UI. Validating the manifest can include checking the agent objects against dependency rules. Dependency rules dictate events that must occur before at least one of the selected agent objects can execute. The UI can display a validation of the agent manifest. A validation service can perform the validation.

Execution of the code block can be predicated on setting up a secure environment in which the associated customer script can execute.

Additionally, executing the code block can be predicated on the user having the requisite permissions required for executing the code block. The user access permissions can be based on a user management profile. The user access permissions can be compared against requirements of the code block to determine whether the code block can be executed.

In one example, the rules engine can determine an access permission level for the user by deriving it based on context of the request related to the user and user device. The usage context can be received in association with the input and analyzed based on user behavior criteria and device criteria.

In an instance in which the user's access permission level does not meet the requirements to execute the code block, the rules engine can take various actions. For example, if a user management profile specifies a default permission level that meets the code block requirements, the rules engine can cause a notification to be displayed to the user for step-up authentication, which can include temporarily denying access to the document. The notice can indicate the access denial. The notice step-up authentication can be a two-factor authentication. Alternatively, the rules engine can cause a warning notice to be sent to the client application and still allow access to the code block since the user's default permission level based on the user management profile would otherwise permit access to the document.

At stage 130, the agent executor can create a nano sandbox for executing the customer script of the code block. The agent executor can make a web service call to create the isolated execution environment. In one example, FastAPI is the webservice used to invoke methods needed to create the nano sandbox. While the web service request is active, the nano sandbox can remain active. When the web service request ends, the nano sandbox is destroyed. This can allow agent executors to create simultaneous and isolated nano sandboxes for thousands of instances of AI agents across the same or different customers.

The nano sandbox can have a minimal footprint, using minimal system resources needed for executing the customer script. The main purpose of the nano sandbox is process isolation. To do this, the nano sandbox can utilize Linux namespaces, seccomp filters, cgroups, or other kernel-level mechanisms to restrict execution. A temporary folder within the nano sandbox can be created. This setup can provide a virtualized or temporary file system to prevent modification of the host system or access to other customers' data. Network access can also be restricted such that it is disallowed or only allows specific connections. The nano sandbox can provide a script execution environment that is ephemeral, meaning no data persists after execution.

The nano sandbox environment itself can be created using bubblewrap, in an example. Bubblewrap (also referred to as bwrap), can create a simple and efficient sandbox that leverages Linux namespaces. Another option is Firejail, which is a security sandbox for Linux that can be used to isolate applications with minimal overhead. GOOGLE's nsjail also is a lightweight sandbox in which untrusted code can be run. Alternatively, the system can use custom seccomp-based Python sandboxes to limit system calls in Python scripts.

The agent executor can pass bwrap as an argument to a subprocess for execution, launching a bubblewrap sandbox. Other arguments can relate to read-only bind mounts. For example, to create the nano sandbox, the agent executor can call procedures that bind system directories as read-only to the nano sandbox. This can ensure that the needed system resources are all present in the nano sandbox such that script execution does not require reaching outside of the nano sandbox. Likewise, by making the system resources read-only, this prevents the customer script from modifying those system resources in a manner that would allow for reaching outside of the nano sandbox.

As an example, "-ro-bind", "/usr/", "/usr/" can bind (i.e., mount) a user system library as read-only inside the nano sandbox. Various libraries and bins can be added with read-only access to the nano sandbox. These system libraries are accessible for execution within the nano sandbox. A "/etc" directory can be mounted read-only to prevent modifications to system configurations. Program code (i.e., scripts) within the nano sandbox can read from these directories, libraries, and bins, but cannot modify them.

The agent executor can specify these mounts using the API of the web service, in an example, as part of evoking the nano sandbox.

Likewise, the agent executor can bind a temporary directory to the nano sandbox, which creates a temporary director inside the nano sandbox. As an example, the command "-dir", SANDBOX_PATH can create an empty directory inside the nano sandbox at a path designated by SANDBOX_PATH. This directory can be the location within which the script executes in the isolated environment. Alternatively, or in addition, the temporary directory can be mounted inside the empty directory. An example binding is "-bind", temp_dir, SANDBOX_PATH. This mounts the temporary directory temp_dir, which can be user supplied, inside the nano sandbox at SANDBOX_PATH. This can allow the customer script to access and modify files only within this directory.

As part of creating the nano sandbox, the agent executor can also define network access within the nano sandbox. This can include turning on specific network access.

In one example, creating the nano sandbox includes unsharing all namespaces, such as with the command "-unshare-all". In Linux, a namespace is a kernel feature that isolates system resources, allowing processes to have their own independent view of these resources. Mount (mnt) isolates the filesystem view, such as different root directories. Process (pid) creates an isolated process tree such that processes in one namespace cannot see others. Network (net) provides a separate network stack, with different interfaces, allowed IP addresses, and things of that nature. User (user) enables different user IDs, allowing for separation of user privileges. The agent executor may unshare all namespaces to prevent all access other than the specific bindings and access then provided by other commands used in creating the nano sandbox.

As one example, the command "--share-net" allows network access inside the nano sandbox. By default, "--unshare-all" would disable network access, so this command explicitly re-enables network access for customer scripts that require it and for users for whom such network access is allowed.

With the nano sandbox created, the agent executor can cause execution of the customer script associated with the code block. This can include wrapping the script with additional functionality, such as functionality for retrieving input and other variables that are used in the script.

To execute a code block, the agent executor can invoke the Python toolkit using a web service, such as FastAPI. The Python toolkit can allow the agent executor to create a sandboxed environment, called a nano sandbox. The nano sandbox can be created through use of bubblewrap, a Linux process. Bubblewrap (bwrap) can be used in Linux to create isolated execution environments. The nano sandbox can execute untrusted code securely, such as executing Python scripts in a restricted environment. The Python toolkit can bind (e.g., mount) system directories to the nano sandbox as read-only, isolate system resources, control network access, and otherwise strictly limit environment variables. The nano sandboxes can be created inside of a privileged container that runs in Kubernetes. Inside of the privileged container, the web service requests can be generated. The web service request creates a nano sandbox and can do so using bubblewrap. Using bubblewrap within the context of a web request, the nano sandboxes can be isolated environments in the kernel with read-only system resources and files needed to execute the customer script.

At stage 140, the agent executor can seed an input variable within the nano sandbox for use with the customer script. The customer script can be wrapped in functionality that seeds the input variable by reading input data from a file inside the nano sandbox.

As an example, the following code can place a file into the nano sandbox and then read input data from the file into an input variable:

with open (""""{os.path.join(SANDBOX_PATH, INPUT_FILE_NAME)}"""", 'r') as file: input= file.read( )

The "os" is an os module that provides functions for interacting with the operating system. This can allow for constructing file paths within the nano sandbox. The os.path.join can ensure that the file designated by INPUT_FILE_NAME is located inside the nano sandbox. The SANDBOX_PATH is the root directory of the nano sandbox, ensuring isolation. The open command opens the file in read mode, designated by 'r'. The contents of the file (i.e., the input data) are then read into the input variable, "input." This input data can be used later in execution of the customer script.

Similarly, the customer script can be wrapped with functionality to read client data or other data types from another file inside the nano sandbox. Variables containing this data can be used in execution of the customer script.

At stage 150, the agent executor causes execution of the customer script within the temporary directory of the nano sandbox. The execution can use the input variable and can result in writing to an output file in the nano sandbox. This output file is used for retrieving the output prior to the nano sandbox being destroyed.

In this restricted environment, a subprocess can execute the customer script, such as Python code. The customer script can be wrapped with input and customer data variables. The input variables can be the user input or an output from any previous step (i.e., agent object execution) of the AI agent. For example, if an LLM step occurred prior to the code block, the output from the LLM can be fed to the code block, such as for sanitization of the LLM output. The exact input to the code block is up to the user who designs the AI agent and depends on the context of the AI agent. The input can then be used in executing the customer script. A read-only input file is placed in the nano sandbox, and the input variable is read from the file. Likewise, other information, such as customer data, can be placed in read-only files and read into variables for execution with the customer script.

The customer script can also be wrapped with functionality to write an output object containing the output of the customer script. The agent executor can retrieve the output from the output object by populating an output variable. Then the nano sandbox can be destroyed, such as when the web service request is completed. The entire nano sandbox can be wiped from memory automatically.

This process can allow for executing customer code without compromising data security and other functionality of the AI platform. Hundreds or thousands of customers can simultaneously execute their own code blocks without any customer getting into another customer's nano sandbox. This allows for creation of more robust AI agents that incorporate customer scripts that can be freely defined and developed by customers of the AI platform.

Example code for wrapping the customer script is shown below: with open ("""{os.path.join (SANDBOX_PATH, INPUT_FILE_NAME)}""", 'r') as file: input=file.read( )
  {execution_request.script_body}
  with open ("""{os.path.join(SANDBOX_PATH, OUTPUT_FILE_NAME)}""", 'w') as file: file.write (output)

The "{execution_request.script_body}" is a placeholder for the customer script, which can be modified to use variables such as "input," "customer_data," and the like. File.write (output) then writes the output to an output file identified based on OUTPUT_FILE_NAME.

In summary, this approach can dynamically generate a Python script by inserting the customer script as a string with variables retrieved from read-only files in the nano sandbox. This involves seeding input variables, executing the customer script, and capturing an output variable. The output variable is then used by the agent executor in completing execution of the AI agent, such as by passing the output variable to the next agent object or by returning it to the user device as an output.

All of this can take place within the nano sandbox, that runs in a subprocess. For example: result=subprocess.run ([ARGS]) can include all of the binding commands previously mentioned, initiate the nano sandbox, and run the script. As another example, a command such as ""python3", os.path.join (SANDBOX_PATH, SCRIPT_FILE_NAME)" executes python3 inside the nano sandbox. Specifically, this command runs the Python script located inside SANDBOX_PATH, which was previously bound to temp_dir.

Outputs from the subprocess can be captured, such as with the following code: stdout=subprocess.PIPE, stderr=subprocess.PIPE, return result. This can capture both the output variable and any errors encountered.

Consequently, at stage 160, the subprocess and/or web request copies an output from the output file to a location outside of the nano sandbox, such as by returning the output to the agent executor. The agent executor returns a result based on that output to display at the user device. Again, the result incorporates an output received from the output file in the nano sandbox. This can mean that the output data (of the output variable) itself is returned to the user device. Alternatively, one or more additional agent objects can use that output data first, returning a result that is still based on the output received from the output file.

At stage 170, the nano sandbox is destroyed. This can occur as a matter of course when the web request is complete. For example, when the process executing inside of bubblewrap ends, the system can automatically wipe the nano sandbox from memory, remove pointers to the nano sandbox, and the like. Alternatively, the agent executor can explicitly destroy the nano sandbox with a command. Either way, all data inside the nano sandbox is destroyed and inaccessible by future processes.

Figure 2:
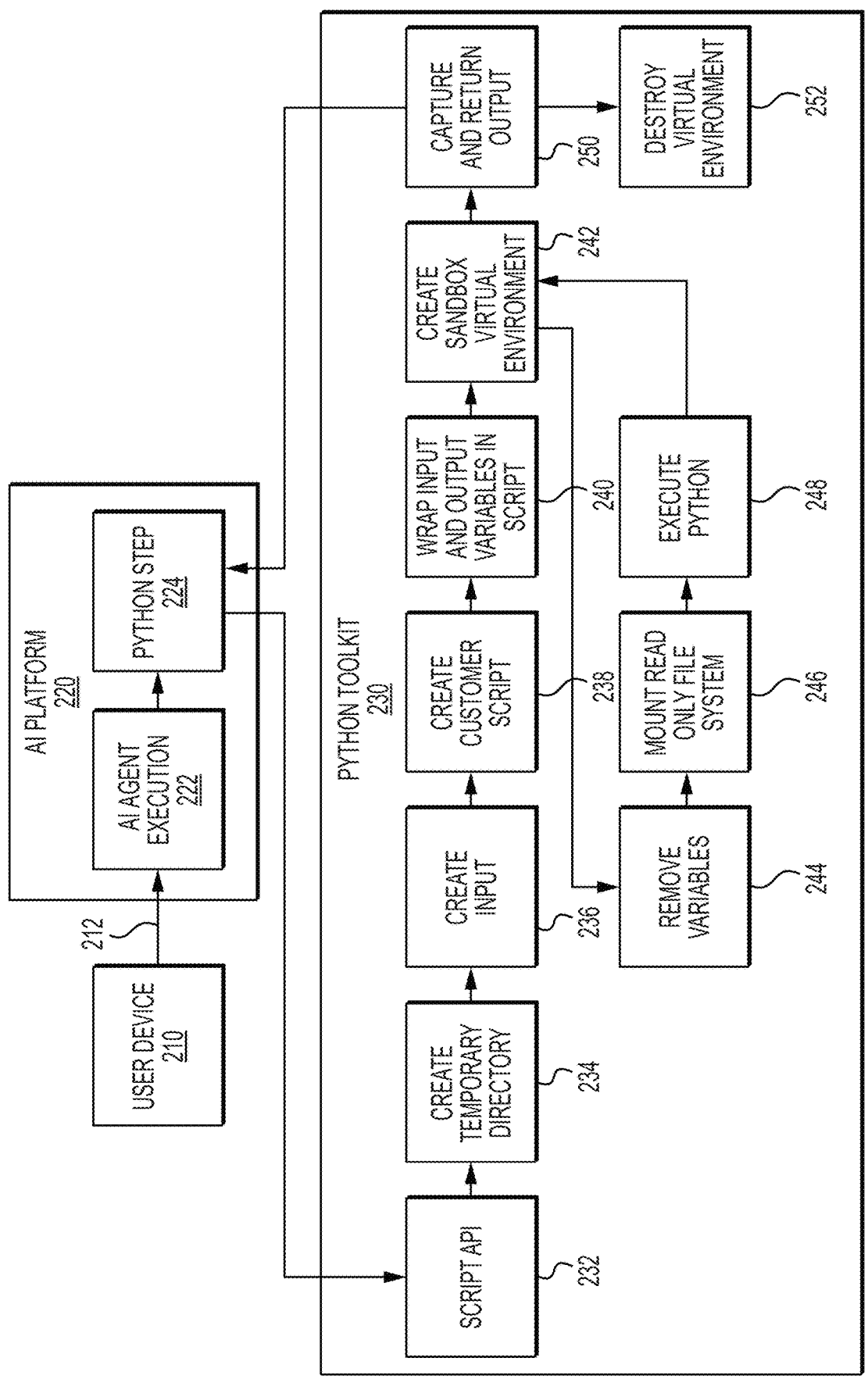
FIG. 2 is a flowchart of an example method for securely executing a code block of an AI agent.

FIG. 2 is a flowchart of an example method for securely executing a code block of an AI agent.

An input can be received at stage 212. The input can originate at a user device 210. A client application can execute at the user device and display a UI. The user can enter information, such as a query, into the UI. Then the input can be sent to a location specified by an endpoint locator. The endpoint locator can be, for example, a uniform resource locator ("URL"). The input can include an endpoint key, such as an API key. This can be used to validate the input at the location of the endpoint locator. The location can be at a server, such as a cloud server that executes an agent executor. The server can be part of the AI platform 220 or a gateway that communicates with the AI platform 220. The agent executor can receive the input and execute agent objects of an AI agent. In this example, the endpoint is associated with an AI platform 220.

The agent executor can perform AI Agent execution at stage 222. The exact AI agent to execute can be based on the endpoint itself and the API key. Additionally, the user can belong to one or more groups or tenants, and this context can dictate which version of an AI agent or which agent objects within the AI agent the agent executor ultimately attempts to execute. For example, the AI agent can execute different code blocks depending on which group the user belongs to. Differing preprocessing by code blocks could be relevant to the different groups, such as with a developer group having more freedom with code-based inputs than a marketing group. A router object (a type of agent object) within the AI agent can check for a group ID from a management profile of the user, and route execution down different paths of the AI agent. These different paths can include different code blocks.

A single tenant can have multiple AI agents with different agent objects for different groups, for example. An AI agent for a developer group can utilize a different prompt package and AI model than an AI agent for a marketing group. The user management profile associated with the user can specify which tenants and groups within those tenants the user belongs to. The agent executor can include a rules engine that operates according to a ruleset in an AI management profile. The rules engine can decide whether to bypass any stages of the AI agent.

In this example, execution of the AI agent in stage 222 can include a Python step at stage 224. This represents an execution step for a code block that includes a Python script. The Python script can be a customer script that is associated ahead of time with the code block.

In one example, the code block is flagged ahead of time for skipping execution in a nano sandbox. Some code can be identified as safe because it does not attempt to access a file, write data to a file, read or modify system resources, or view or modify system or user permissions. Such code can be executed without the nano sandbox, in an example. Otherwise, a nano sandbox can be utilized to protect system integrity during customer code execution.

As will be discussed in FIG. 6, the analysis for flagging a code block can be performed in advance by the AI platform, such as when the user is modifying the code for the code block. Updating the code block during AI agent design on a UI can trigger a process for semantic evaluation of the code. The semantic evaluation can determine what actions the code will take, and determine whether any of those actions involve reading, writing, or modifying anything outside internal variables to the code (e.g., script) itself. For example, the code can be an input to a language model, along with prompts causing the language model to look for this specific issue, and return a result that indicates whether the code attempts to read, write, or modify anything outside of itself, such as a file, system resource, or privilege. If so, then the code block will require execution in a nano sandbox. Otherwise, it need not. The system can flag the code block appropriately such that the agent executor knows how to execute the code block at stage 224, and specifically whether the code must execute in the nano sandbox or not.

To execute the Python step of the code block at stage 224, the agent executor can utilize the Python Toolkit 230. Python Toolkit 230 can be a Python webservice that utilizes an API, such as FastAPI. The API can define which commands are available to the agent executor for creating a nano sandbox and securely executing the customer script of the code block. The Python Toolkit 230 can execute on one or more Linux servers, in an example. The Python Toolkit 230 can act as a container and receive input from the AI agent, such as the user input or an output from an agent object that is part of the AI agent, along with the customer script of the code block and other information.

At stage 232, the agent executor makes a script API call, which can supply the input, the customer script, and other information, such as resources needed or customer data.

The API can be used to create the nano sandbox, including creating a temporary directory at stage 234. The temporary director can hold files and be the designated location where the customer script will execute.

The API can also wrap the customer script, such as by prepending and postpending functionality for reading and writing variables. At stage 236, this can include creating the input variable(s). The agent executor can supply an input, which again can be the user input or an output from an agent object of the AI agent. At stage 238, the agent executor can use the script API to dynamically create the customer script. This can include retrieving the customer script that is associated with the code block and inserting the script into a placeholder in a subprocess command, along with inserting locations in the script for variables that will be filled from information inside the nano sandbox.

At stage 240, the API can cause the customer script to be wrapped with input and output variables. Again, this can include prepending and postpending functional commands around the customer script that cause the reading of inputs and the writing of outputs.

At stage 242, the virtual environment of the nano sandbox is created. This can include binding various read-only system resources and libraries, clearing namespaces, and defining whether network access is allowed. Additionally, folders and files can be added to the virtual environment, based on anticipated needs of the customer script. A read-only input file can be added to include input data needed for the customer script. A read-only customer data file can be added to include customer data needed for the customer script. User-specific data can likewise be added to a read-only file. These files are then used by the wrapped customer script to pull values for use in the execution of the customer script and/or to write values to one or more output files.

In one example, at stage 244, environment variables are removed. This can include removing all namespaces to prevent, for example, access to the file system of the AI platform or another server. By removing environmental variables, the customer scripts are prevented from accessing secrets, such as stored passwords and things of that nature. User administrative privileges are removed, and network access can be restricted.

At stage 246, the Python Toolkit 230 mounts a read-only file system that allows for executing the customer scripts without. This includes mounting specific read-only libraries and files that can be used during script execution.

At stage 248, the Python Toolkit 230 can execute the customer script. This occurs within the virtual environment of the nano sandbox, utilizing the read-only file system, the wrapped input variables that are seeded from files in the nano sandbox, and writing to an output file in the nano sandbox. The entire execution does not reach outside of the nano sandbox in an example.

At stage 250, the Python Toolkit 230 captures and returns the output. This can include reading output data that was written to an output file in the nano sandbox as a result of executing the customer script. The output can be returned to the execution agent as a result of the API call made by the execution agent that caused execution of the customer script.

With the webservice request complete, the nano sandbox is destroyed at stage 252. The virtual environment and its contents are gone and can no longer be accessed. The temporary directory of stage 234, the virtual environment, the variables, python code within it, and files within it are deleted.

After the output is returned to the agent executor, the agent executor can continue to execute any remaining agent objects of the AI agent. For example, the AI agent can include one or more semantic search agent objects. The code block may have resulted in an output that allows the agent executor to select the appropriate vector databases to semantically search or may have set a closeness threshold used in determining semantic matches. The AI agent can use the output in searching various data sources. These can be different vector databases, and any number of different data sources can exist.

The semantic search can include vectorizing the input such that one or more input vectors can be used in searching the one or more vector databases. Then, a vector comparison can reveal the closest vectors to the input vectors based on some distance and/or angle. Chunks can be deemed responsive when they correspond to vectors meeting a threshold similarity. An embedding model can perform the comparison.

For responsive data chunks, access permissions can be identified by using metadata stored with the responsive chunks. For example, the metadata can identify the permissions, such as by providing a sensitivity ID that corresponds to a permissions level. Alternatively, the metadata can include a link or other location information for retrieving the permissions. In one example, the permissions can vary across portions of the same document, which can be represented by different chunks having different access permissions.

The AI agent can utilize the identified multiple chunks in generating a first output. For example, the chunks can be fed with prompts into an AI model, such as a language model, that generates a first output. The AI agent can also include prompts that are supplied with the responsive chunks to the AI model. The AI model can modify and/or format the responsive chunks as instructed by the prompts and send an output back to the agent executor. The agent executor can perform post processing, such as looking for inappropriate inclusions in the output. The post-processed output can be sent back to the client device.

Figure 3:
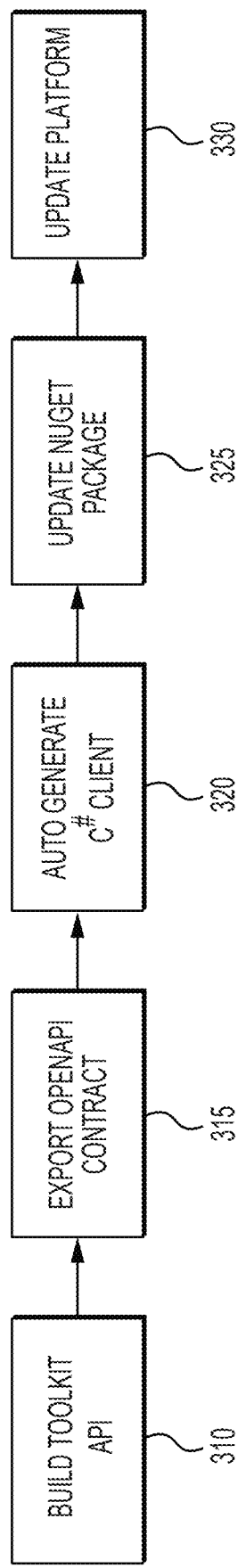
FIG. 3 is a flowchart of an example method for enforcing a contract between an AI platform and a Python toolkit.

FIG. 3 is a flowchart of an example method for API client deployment. This can enforce a contract between an AI platform and a Python toolkit. This allows for deploying the Python toolkit with strict compatibility between the Python toolkit and the AI platform. The system can define and enforce an API contract in a NuGet package. By creating, updating, and maintaining a C# API client for the Python toolkit integration with the AI platform, the API contract remains strongly enforced and updates can propagate across the system.

At stage 310, the AI platform can build the API service or backend that the Python toolkit interacts with. Any changes to API logic can be compiled and validated. To compile the backend application "dotnet build" can be used for a .NET service. An administrator can run unit tests to verify correctness and ensure API stability before exporting the OpenAPI contract.

At stage 315, once the API is built, the AI platform can export the OpenAPI contract. This contract can define the API structure, including available endpoints, request and response data models, and authentication methods.

At stage 320, the AI platform can autogenerate a C# client. The C# client acts as a wrapper that makes calling the API easier for .NET applications and other applications. This can allow the agent executor to invoke the Python toolkit and related methods for customer script execution.

At stage 325, the C# client is included in an updated NuGet package. For example, the package can be referenced as Platform.Python.ToolKit.Client. This allows other applications, such as the agent executor, to easily install and reference the updated API client. The NuGet package can contain interfaces or classes that define how the Python toolkit should be invoked. It can also include data models to structure requests and responses, as well as networking logic for communications between the AI platform and the Python toolkit.

At stage 330, the AI platform is updated to use the latest NuGet package. In general, this can update the AI platform's dependencies to use the new API client version. This ensures API consistency across different services of the AI platform that may need to execute customer scripts of a code block.

Figure 4:
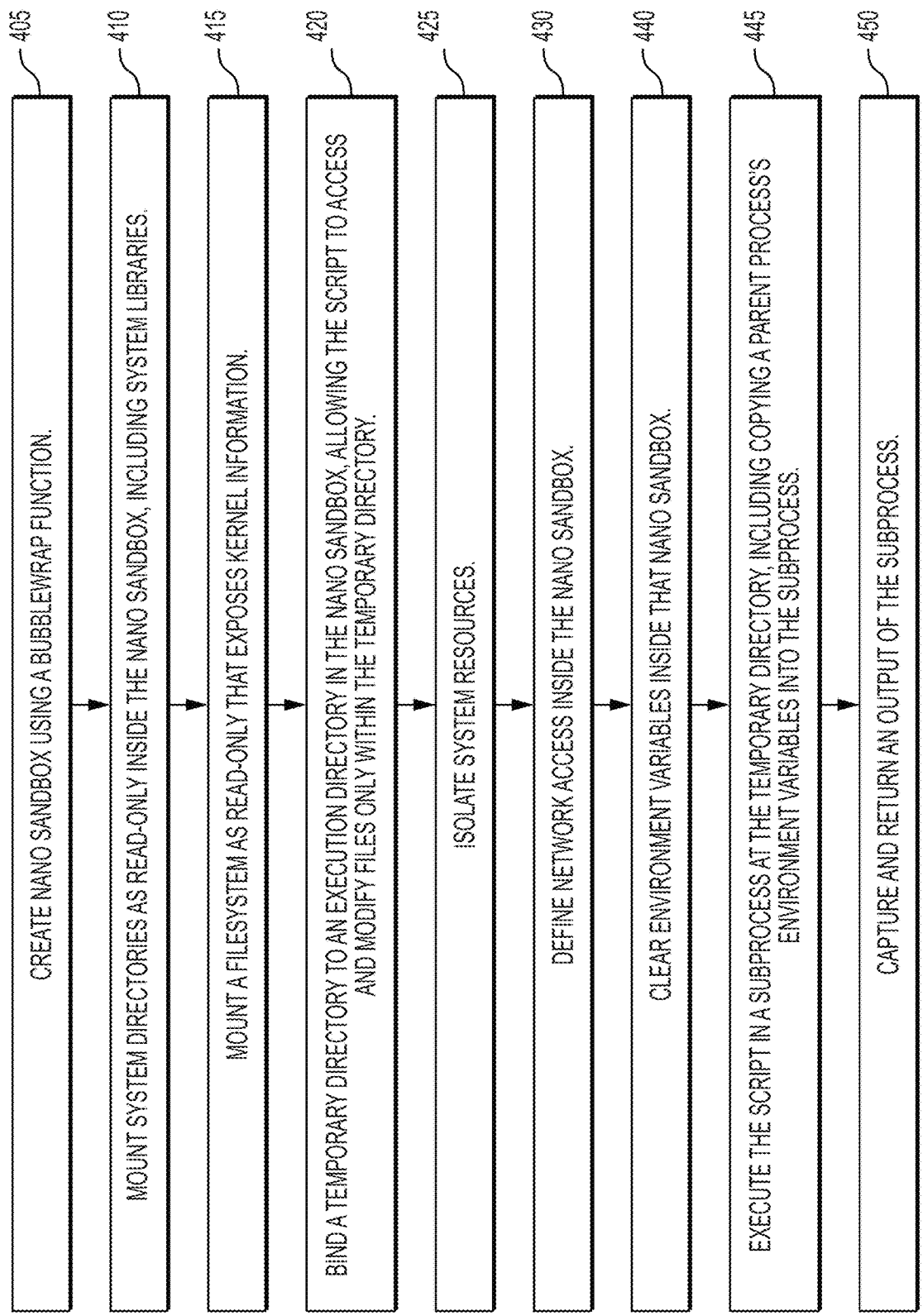
FIG. 4 is a flowchart of an example method for creating a nano sandbox environment using bubblewrap and executing a customer Python script.

FIG. 4 is a flowchart of an example method for creating a nano sandbox environment using bubblewrap and executing a customer Python script. At stage 405, the agent executor can invoke the Python toolkit to create a nano sandbox using a bubblewrap (bwrap) function. This can include making an API call that identifies a temporary directory path.

A subprocess can run to create the nano sandbox. This can include, at stage 410, mounting system directories as read-only inside the nano sandbox, including system libraries. An example includes binding directories as follows:

"--ro-bind", "/usr/", "/usr/",
"--ro-bind", "/bin", "/bin",
"--ro-bind", "/lib", "/lib",
"--ro-bind", "/lib64", "/lib64",
"--ro-bind", "/etc", "/etc",
"--ro-bind", "/proc", "/proc", Programs inside the nano sandbox can read from these directories but cannot modify them. System libraries (/usr, /lib, /bin) are still accessible for execution. The /etc directory is mounted read-only to prevent modifications to system configurations.

As part of this, at stage 415, the Python toolkit can mount a filesystem as read-only that exposes kernel information. For example, the /proc pseudo-filesystem (which exposes kernel and process information) is also mounted read-only.

At stage 420, the Python toolkit can bind a temporary directory to an execution directory in the nano sandbox, allowing the script to access and modify files only within the temporary directory. As an example, "--dir", SANDBOX_PATH can create an empty directory in the nano sandbox at SANDBOX_PATH, and bind ", temp_dir, SANDBOX_PATH can then mount a temporary directory at that location. This can allow the script to access and modify files only within the temporary directory.

At stage 425, system resources can be isolated, such as by unsharing namespaces. This isolates mount points, process IDs, user and group IDs, and network namespaces that are not otherwise explicitly shared.

Then, at stage 430, the Python toolkit can define network access from within the nano sandbox. A command such as "--unshare-all" in stage 425 would disable network access, so stage 430 can explicitly re-enable it.

At stage 440, the Python toolkit can clear environment variables inside the nano sandbox. This can prevent the sandboxed script from inheriting potentially dangerous or unnecessary environment variables from a parent process. New restricted environment variables can be set inside the nano sandbox, such as to only allow executables in /usr/local/bin to be found. The Python toolkit can also change the working directory to the SANDBOX_PATH to ensure the script executes from there. The Python sandbox can further drop all Linux capabilities, ensuring the script cannot escalate privileges, modify system settings, create raw sockets, or load kernel modules.

Within this secure environment, at stage 445, the Python toolkit can execute the script in a subprocess at the temporary directory. This can include copying a parent process's environment variables into the subprocess. However, since the environment variables were previously cleared, the parent process's environment variables may not be inherited inside the nano sandbox unless explicitly passed. Example code can include:

"python3", os.path.join(SANDBOX_PATH, SCRIPT_FILE_NAME) env=os.environ.copy( )

At stage 450, the Python toolkit can capture and return the output. This can include returning both output data and any error data of the subprocess.

Figure 5:
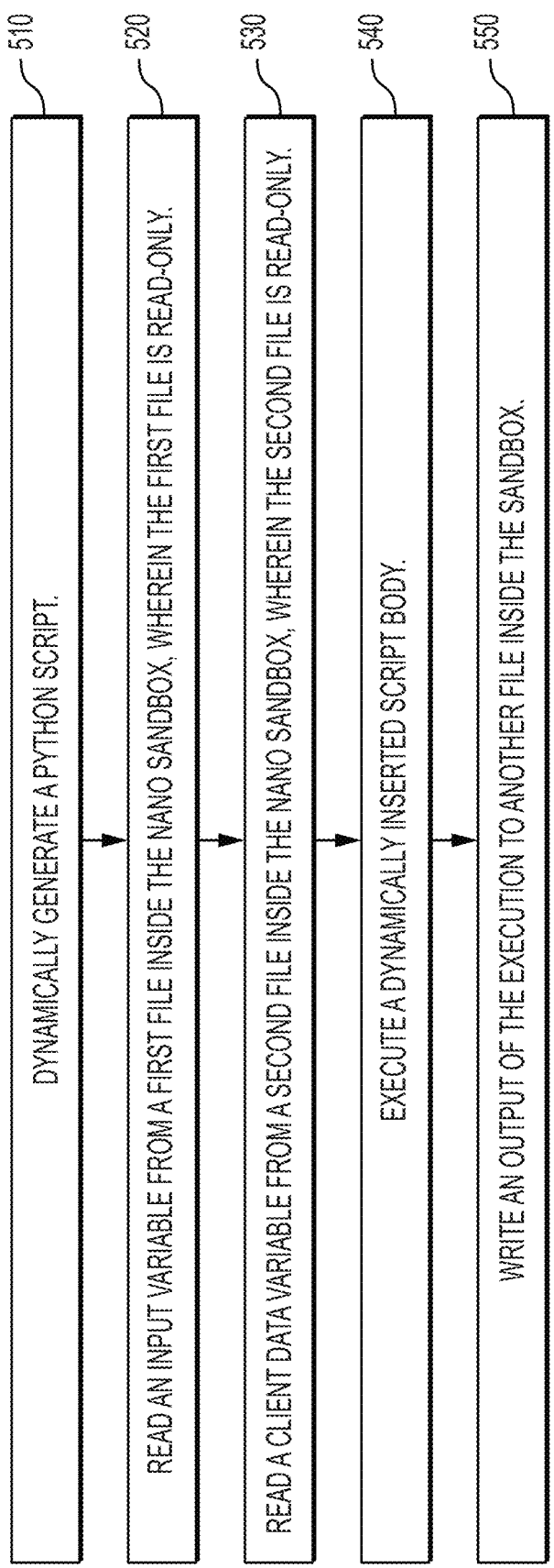
FIG. 5 is a flowchart of an example method for wrapping a customer Python script with input and client data variables for execution in the nano sandbox.

FIG. 5 is a flowchart of an example method for wrapping a customer Python script with input and client data variables for execution in the nano sandbox. At stage 510, the Python toolkit can dynamically generate a Python script based on the customer script of a code block. This can include wrapping the customer script with a command to retrieve an input variable from an input file and a command to write an output variable to an output file. The input file is placed in the nano sandbox.

The script itself can be a multiline string.

At stage 520, the Python toolkit can read an input variable from a first file inside the nano sandbox, wherein the first file is read-only. Example code for this is shown below: with open ("""{os.path.join(SANDBOX_PATH, INPUT_FILE_NAME)}""", 'r') as file: input=file.read( )

This code constructs a file path for the input file, ensuring that the file is located inside the nano sandbox. The file is then opened in read mode ('r'), and the Python toolkit reads the file contents into the "input" variable.

At stage 530, the Python toolkit can read a client data variable from a second file inside the nano sandbox, wherein the second file is read-only. This can be done the same way as described regarding the input file in stage 520. The client data can be additional information that is specific to the customer and used in the executing the script.

At stage 540, the Python toolkit can execute the dynamically inserted script body, which can include the customer script and the variables. A placeholder can be filled with the string of the script body, which then processes the input and client data and produces an output.

At stage 550, the output can be written to an output file inside the nano sandbox. The output file can be written in write mode, resulting in the output being saved to a file inside the nano sandbox.

The subprocess can then retrieve the output from the output file and return it to the agent executor. The nano sandbox can then be destroyed.

Figure 6:
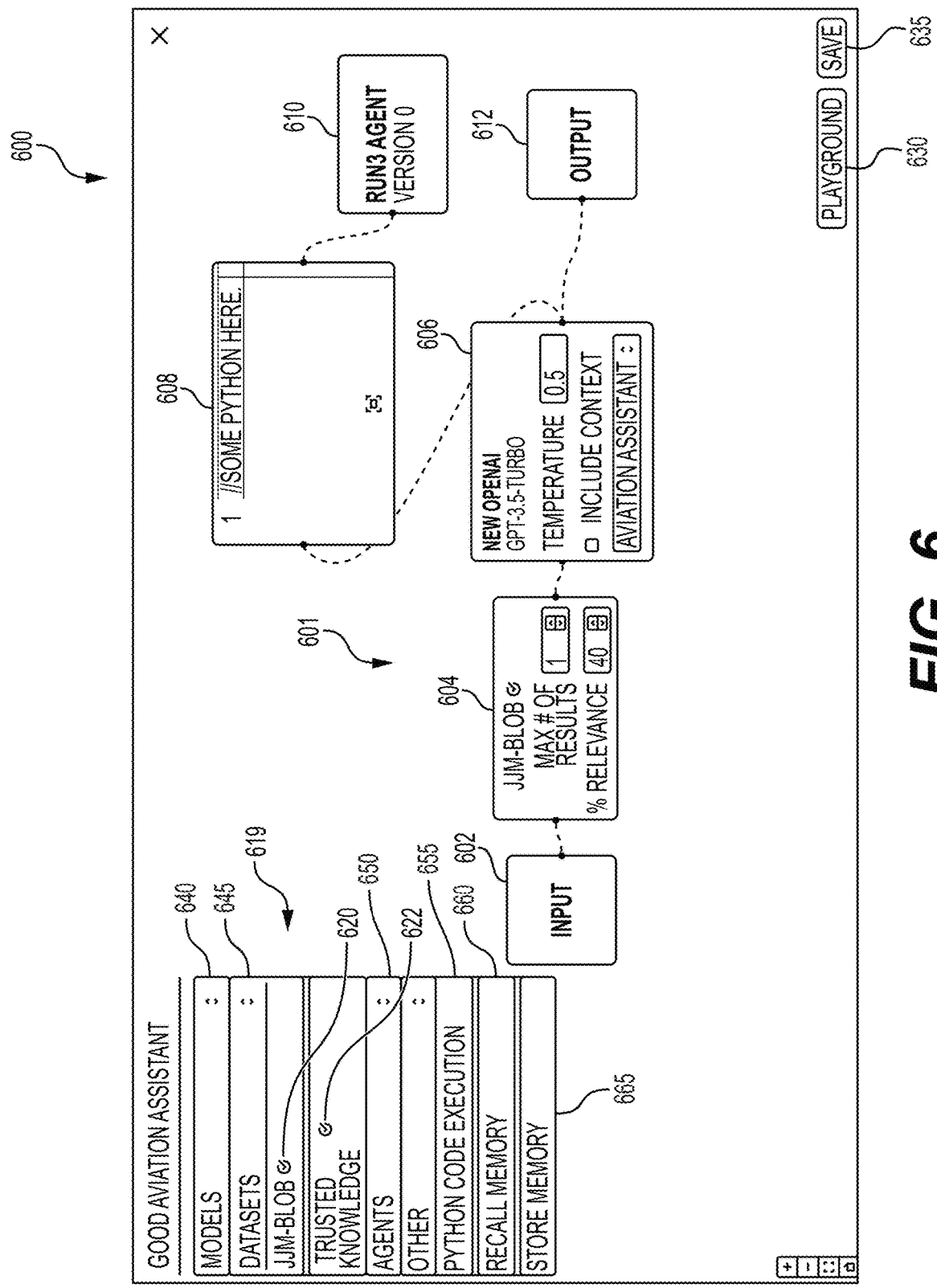
FIG. 6 is an illustration of an example user interface for defining and testing an AI agent that includes a code block.

FIG. 6 is an illustration of an example user interface for defining and testing an AI agent that includes a code block. This UI 600 can be offered as part of the AI platform, allowing administrators or customer users to customize AI agents.

In this example, a code block 608 is included as an agent object in the displayed AI agent 601. AI agent 601 includes the following agent objects: an input block 602, a dataset block 604, an AI model 606, a code block 608, another code block 610, and an output block 612. As shown, the agent objects are connected in a sequence represented by dashed lines, with the output of the AI model 606 going to both the output block 612 and to the code block 608. The name of this particular AI agent is "Good Aviation Assistant." The input block 602 receives the initial user input. The dataset block 604 refers to a dataset called "jjm-blob" and permits a user to specify a percentage relevance to use in an embedding search of the dataset, along with a maximum number of results to output. AI model 606 represents a model object named "New OpenAI," and permits a user to specify a temperature to use, include context from a predefined data source, and select a prompt object (shown as a prompt object named "Aviation Assistant") to use. Code block 610 represents code or a customer script named "Run3 Agent". Output block 612 represents an output object, which returns a result from the AI agent to the user device.

In addition, the graphical representation of the AI agent 601 includes a code block 608 that permits a user to input program code (i.e., a customer script) for the custom code object. Any suitable custom code can be entered, such as code for post-processing of outputs generated by the AI model 606, or code for other tools. In some embodiments, the user can input any desired program code into a custom code object, such as code for redacting certain information from text data, or code to otherwise modify text data.

In one example, when a user saves code (e.g., a Python script) to the code block 608, the AI platform triggers a process to determine whether the code must execute within a nano sandbox. The process can semantically evaluate the code to determine what actions the code will take, identifying any actions that require a nano sandbox. For example, a language model can receive the code as an input, along with prompts to check for any reading, writing, and modification that would occur outside of the code itself. This can include detecting if the code could hijack the agent executor or change system resources or permissions granted to resources or users. Anything that writes to files or deletes files can be forbidden outside of execution in a nano sandbox. Specific files and file types can also cause a prompt to the user regarding what could be altered. If the user persists with saving that code, then an alert can be sent to an administrator.

The process can flag the code block to indicate whether the code must be executed inside of a nano sandbox. In one example, the flag can indicate that a nano sandbox is required. In another example, the flag can indicate that the nano sandbox can be skipped. This implementation detail can vary between examples.

Skipping the nano sandbox steps for "safe" code can help preserve system resources in an example.

In one example, an icon can display on the code block 608 within the UI 600 to indicate whether the code block will be executed in a nano sandbox. When the user mouses-over or clicks the icon, a separate message can be displayed regarding why the nano sandbox is needed, such as by identifying actions towards file types or properties that were identified by the triggered process. This can allow the user to iteratively modify their code if there is a reason the user or tenant would like to avoid adding the nano sandbox steps to execution of the AI agent.

The agent objects 604, 606, 608 are connected with dashed lines that visually indicate execution linking. The AI agent 601 begins at input block 602 and follows the visualized execution flow according to the established execution linking.

Various other agent objects can be selected for inclusion in the AI agent from the menus on the left side of the UI 600. For example, agent objects are organized into drop-down lists for models 640, datasets 645 (showing selection of JJM-BLOB 620), trusted knowledge, AI agents 650, Python code 655, and functions for recalling memory 660 and storing memory 665. The Python code 655 allows for creating code blocks using pre-existing customer scripts, which may or may not have been added by the customer.

The playground button 630 can allow the user to simulate execution of the AI agent for testing purposes. The simulated execution can execute an AI agent that corresponds to the validated AI agent manifest. The AI agent can be active and available at an endpoint, or inactive and not currently available at an endpoint. To initiate the simulated execution, a user can select an option on the UI. The user can input a test query or select a series of test queries for use in the simulated execution. Either way, the system can receive a test query in the UI. The system then causes the selected agent objects to be executed in an order that follows the execution linking displayed within the UI. The test query can be an input at one or more of the agent objects, just depending on the AI agent design. The system can then cause an output of the simulated execution to be displayed in the UI based on the test query.

The simulated execution can include executing the code block portion of the AI agent. This can include using the webservice API to cause the Python toolkit to create the nano sandbox, bind read-only system resources such as a file system (e.g., system directories, libraries, and files), execute a wrapped customer script, retrieve an output, and destroy the nano sandbox.

The administrator can identify at least one execution metric to monitor as part of the simulated execution. The execution metric can include outputs from the agent objects or the output of the AI agent. The execution metric can also include execution durations for the AI agent or one or more agent objects. Cost metrics and token metrics can also be execution metrics. The simulated execution then causes the selected execution metrics to be displayed on the UI. For example, the various outputs can display in the UI, the cost of execution can display, and the number of tokens can display.

When the user is satisfied with their AI agent 601, the user can save the AI agent 601 using the save button 635. This can make the AI agent 601 available for deployment, such as at the AI platform or at a gateway.

As shown, a user can select a "Datasets" drop-down menu and an "Other" drop-down menu in the menu section 619 to view available dataset objects and other available objects, respectively. Illustratively, in the "Datasets" drop-down menu, statuses of a "jjm-blob" dataset object and a "Trusted Knowledge" dataset object are indicated using status indicators 620 and 622, shown as checkmarks. By dragging-and-dropping objects from the menu section 619, a user can design an AI agent. For example, to quickly switch from using an outdated AI model to using a new AI model, a user can replace a model object associated with the outdated AI model with a model object associated with the new AI model in an AI agent.

Figure 7:
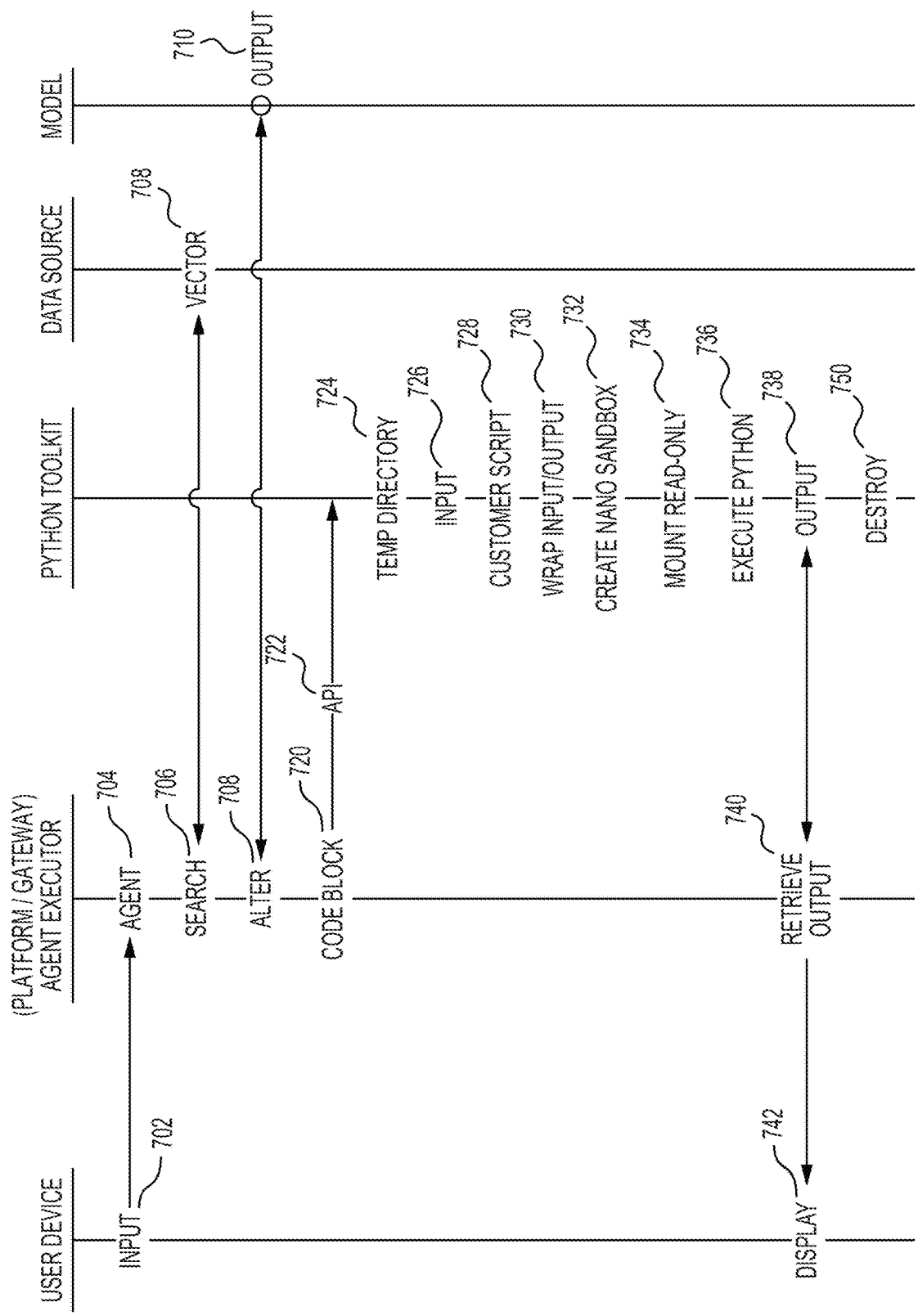
FIG. 7 is an illustration of an example sequence diagram for executing an AI agent that includes a code block.

FIG. 7 is an illustration of an example sequence diagram for executing an AI agent that includes a code block. At stage 702, a user enters an input at a user device. The input can be part of a client application that utilizes an AI agent. The client application can include an endpoint and an endpoint key, causing the client application to contact the endpoint and send the input. The endpoint can be an address at the AI platform or a gateway associated with the AI platform. An agent executor at the endpoint can receive the input and execute an AI agent for which the input is intended at stage 704.

The AI agent can include various agent objects that the agent executor causes to execute. In this example, at stage 706, the agent executor causes a semantic search of a data source. This can cause the input to be vectorized and compared against a vector database at stage 708. The closest vectors can cause corresponding data chunks to be returned to the agent executor. At stage 708, the agent executor can execute an AI model agent object to alter the results of the semantic search. The agent executor can send a prompt package and the data chunks to the AI model, which then sends back an output at stage 710.

The next agent object in the AI agent is a code block, which the agent executor executes at stage 720. The output of the AI model from stage 710 can be an input for a customer script that is assigned to the code block.

To execute the code block, the agent executor can make an API call at stage 722 to instantiate a nano sandbox via a Python toolkit, which can execute on one or more servers as one or more processes. The agent executor can communicate with the Python toolkit using web requests defined through the API. The API calls can cause the Python toolkit to execution a subprocess that establishes a temporary directory in the nano sandbox at stage 724. An input file can be placed in the directory at stage 726. The input file can include the output from stage 710. Additionally, at stage 728, a customer script can be dynamically generated, which at stage 730 can include by wrapping the customer script of the code block with commands for retrieving the input variable from the input file, among other variables.

The nano sandbox can be created at stage 732 by mounting (e.g., binding) read-only system resources at stage 734, and generally isolating procedures that will run in the temporary directory. At stage 736, the Python toolkit can execute the customer script created in stage 728. This can cause the writing of output data to an output file in the temporary directory at stage 738. Then at stage 740, the subprocess can seed an output variable from the contents of the output file and then return the output data of the output variable to the agent executor, causing the agent executor to now have the output of the code block. With the web request complete, the Python toolkit destroys the nano sandbox and its contents at stage 750.

At stage 742, the agent executor returns the output from the code block to the user device, where the output displays within the client application.

Figure 8:
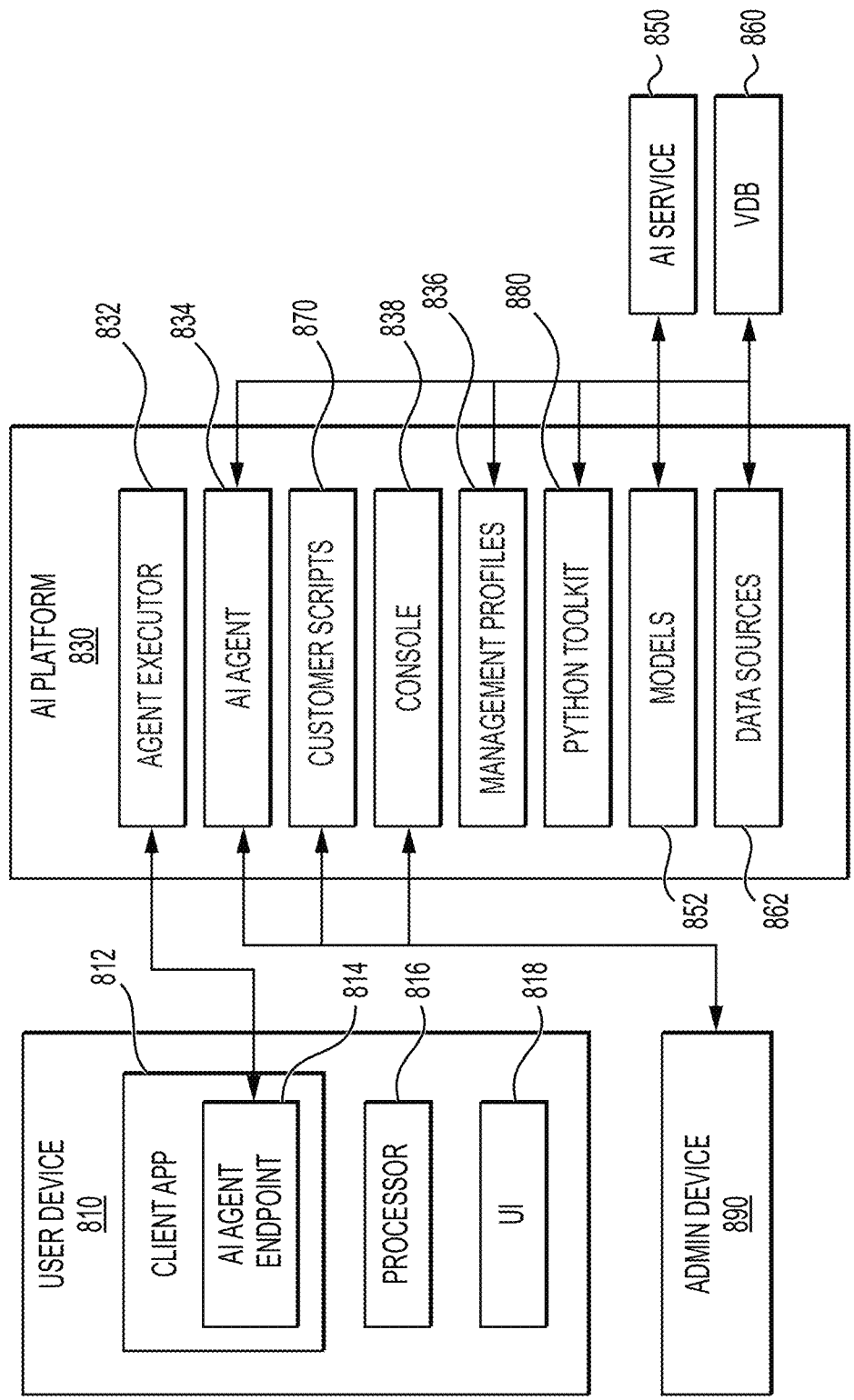
FIG. 8 is an illustration of example system components for executing an AI agent that includes a code block.

FIG. 8 is an illustration of example system components for executing an AI agent that includes a code block.

A user device 810 can execute a client application 812 that utilizes an AI agent. The user device 810 can be any processor-based device, such as a phone, tablet, laptop, or personal computer. The processor 816 can execute the client application 812. The client application 812 can include an AI agent endpoint 814 that is used to access some or all of the AI agent. The AI agent endpoint 814 can be an address, such as a URL, that corresponds to an agent executor 832, which can be one or more processes that execute on one or more physical servers. For example, the agent executor 832 can operate on a proxy or gateway server. The agent executor 832 can also operate in the cloud, or as part of an AI platform 830. The AI platform 830 can operate on one or more servers and provide a UI as part of a console 838 for allowing administrators to design the AI agent 834 (among others) and set management rules for those. An administrator can connect to a console 838 using an administrator device 890, in an example. The connection can be remote, such as over the internet, and the administrator device 890 can be any processor-enabled device, such as a laptop. The management rules can be stored in management profiles 836, which the agent executor 832 (including the rules engine) can use for executing the AI agent 834.

The agent executor 832 can rely on a rules engine for enforcing rules on inputs from the client application 812 prior to those inputs being transmitted to a particular AI model among AI models 852, such as at AI service 850. The rules engine can also dictate which data sources 862, such as vector databases 860, are available to the user. For example, a vector database 860 can include access restrictions and the user may need adequate permissions to gain access. The rules engine can comprise one or more processes that are executed on one or more physical servers.

The AI platform can maintain a store customer scripts 870, which can be any type of client code. The customer scripts 870 can be associated with code blocks that are utilized in AI agents 834. The customer scripts 870 can be in Python or in other programming languages.

To execute the customer scripts 870 securely, the agent executor 832 can make calls to a Python toolkit 880, which can operate as container and be comprised of one or more processes. An API can define different functions available at the Python toolkit 880. The Python toolkit 880 can execute at the AI platform 830 or at some other server, such as in the cloud. The API can allow for the creation of many simultaneous nano sandboxes. Each nano sandbox isolates the execution of a customer script 870 such that the customer scripts 870 cannot access information in other nano sandboxes or at the AI platform 830 generally.

The Python toolkit 880 can dynamically create customer scripts by wrapping stored customer scripts 870 with additional functionality for inputting and outputting variables to and from files in the nano sandbox. This can ensure that the script does not attempt to go outside of the nano sandbox for system resources and the like.

The rules can be applied differently to different users, who are tracked via user management profiles 836 that are stored by a management server and/or the AI platform. The management server can be part of AI platform 830 or separate. The management server(s) can execute the AI management service on one or more processors. The management profiles 836 can track information about users, groups, and tenants, and can include AI management profiles and AI user management profiles. The tenants can be customers or customers of customers. The groups can be divisions within those tenants, such as a developer group or an executive group. Various management rules, including security control markers, can be associated with the different management profiles 836. For example, the management rules discussed above can be stored in management profiles 836, which are assigned to particular users, groups, and tenants.

For example, an AI management profile can be retrieved that includes a ruleset defined by multiple security control access markers for deriving a user permission level. Security control access markers can be set by an administrator and specify what to look for in the input and in contextual data received with the input. The security control access markers can delineate contextual and content characteristics that are required for the user to have a particular access permission. The derived access permission can be limited by a default access permission of the user management profile associated with the user. For example, when the user's default access permission is P2, as specified by the user management profile, then the derived access permission either cannot exceed P2 or still will not grant full P1 permissions based on the default access permission being only P2. The AI platform 830 or an outside management service can maintain user management profiles that indicate default permissions for users. The default permissions can be based on groups to which the user is associated, roles, or can explicitly map to one of multiple permissions levels. The default permission level can indicate a maximum permission level for the user. However, the derived access permission level can be based on analysis of the usage context in view of the security control markers and can fall short of the default access permission level. This can cause the user to be restricted to access of code blocks or of content at the lower derived access permission level. The rules engine can cause the user to be prompted for additional login information to bring the derived access permission level into alignment with the default.

Consequently, the derived access permission and the default access permission for a user can cause the rules engine to determine availability of code blocks, system resources used by the customer scripts, as well as content (such as various chunks and vector databases) and even language models. The rules engine can evaluate an input and contextual data in real-time. The contextual data can include contextual information about the user's network or encryption settings, user location, and device characteristics. The rules engine can receive the usage context (contextual data) in association with the input. The input and contextual data can be compared against security control markers as part of deriving the access permission for the user.

The AI management profile can include the security control markers. The security control markers can be set by an administrator using a UI at the AI platform (e.g., the AI management service). The security control markers can include device-related compliance rules that relate to user location, user work hours, application usage characteristics, application settings requirements, authentication requirements, network requirements, and the like. The derived access credential can be an access score, and the access score can map over to established permissions levels such as P1, P2, and P3.

In one example, the security control markers can be enforced by a management controller or the rules engine to create the access score. The management controller can execute at the user device to track and report user activity and other contextual data. The access score can be compared against multiple thresholds that map to different access privileges. For example, to access highly confidential documents, the access score may need to be higher than for accessing confidential documents. To access documents with special sensitivity levels, different access scores may be required. The access score can also be calculated fully or in part by the rules engine at the gateway. For example, the management controller can report context related to the security control markers, which are then analyzed at the gateway or by a different service utilized by the gateway.

The AI management profile can be one or more files received by the rules engine from an AI management service, which can operate locally or remotely to the rules engine. The rules engine can compare the security control markers to the usage context as part of deriving the access permission level. Additionally, a user management profile can specify a default permission level for the user, and the derived access permission level can be relative to the default. In instances in which the derived access permission level is less than the default permission level, the rules engine can notify the client application so that the user can take corrective actions.

The management service can include a UI 818, which can be code that gets rendered on a screen by the user device 810. The management service can also include rule enforcement logs. These logs can track the various inputs, outputs, rules implicated, and remedial actions taken.

Other examples of the disclosure will be apparent to those skilled in the art from consideration of the specification and practice of the examples disclosed herein. Though some of the methods described have been presented as a series of steps, it should be appreciated that one or more steps can occur simultaneously, in an overlapping fashion, or in a different order. The order of steps presented is only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for securely executing code blocks for artificial intelligence (AI) agents, comprising:
receiving, from a user device, an input associated with an AI agent;
executing the AI agent by an agent executor, wherein the AI agent includes a code block for executing a customer script;
creating a nano sandbox for executing the customer script of the code block, including:
binding system resources as read-only to the nano sandbox;
binding a temporary directory to the nano sandbox; and
defining network access within the nano sandbox;
seeding an input variable within the nano sandbox for use with the customer script;
executing the customer script within the temporary directory of the nano sandbox, the customer script utilizing the input variable, wherein the execution of the customer script results in writing to an output file in the nano sandbox;
copying an output from the output file to a location outside of the nano sandbox; and
destroying the nano sandbox.

2. The method of claim 1, wherein the customer script is a Python script that a customer assigns to the code block.

3. The method of claim 1, wherein the input variable is generated by a prior an agent object of the AI agent that executes prior to the code block.

4. The method of claim 1, wherein the input variable is retrieved from a read-only file included in the nano sandbox.

5. The method of claim 4, wherein the read-only file includes the input received from a user device, and wherein a result based on the output is displayed at the user device.

6. The method of claim 1, further comprising reading client data from a file in the nano sandbox, wherein the client data is used in executing the customer script.

7. The method of claim 1, wherein a subprocess executes the customer script within the temporary directory.

8. The method of claim 7, wherein the output and an error are written to the output file.

9. The method of claim 1, wherein defining the network access includes enabling the network access.

10. The method of claim 1, wherein creating the nano sandbox includes clearing environmental variables.

11. The method of claim 1, wherein creating the nano sandbox includes dropping all Linux capabilities.

12. The method of claim 1, wherein the customer script is wrapped in logic to seed the input variable and capture the output for writing to the output file.

13. The method of claim 1, further comprising deploying a Python toolkit that is a Python webservice, wherein the Python toolkit creates the nano sandbox.

14. The method of claim 13, wherein the Python toolkit includes an application programming interface ("API") and a NuGet package, and wherein the agent executor utilizes the API to receive the output.

15. The method of claim 1, wherein a user interface ("UI") of an AI platform includes an option for adding the code block to the AI agent, wherein the UI includes a window for inserting the customer script into the code block.

16. The method of claim 15, wherein the UI allows a user to at least:
select agent objects including a dataset, an AI model, and the code block;
connect the agent objects in a sequence for execution as the AI agent; and
simulate execution of the AI agent, wherein the simulated execution causes the creating and destroying of the nano sandbox as part of executing the code block.

17. The method of claim 1, wherein creating the nano sandbox includes unsharing namespaces, wherein unsharing namespaces disables networks access and defining the network access enables the network access.

18. The method of claim 1, further comprising placing, into the nano sandbox, a first read-only file that is used to seed the input variable and a second read-only file that is used to seed a customer data variable, wherein both the input variable and the customer data variable are used in the execution of the customer script.

19. A non-transitory, computer-readable medium containing instructions for securely executing code blocks for artificial intelligence (AI) agents, wherein the instructions are executed by at least one processor to perform stages comprising:
receiving, from a user device, an input associated with an AI agent;
executing the AI agent by an agent executor, wherein the AI agent includes a code block for executing a customer script;
creating a nano sandbox for executing the customer script of the code block, including:
binding system resources as read-only to the nano sandbox;
binding a temporary directory to the nano sandbox; and
defining network access within the nano sandbox;
seeding an input variable within the nano sandbox for use with the customer script;
executing the customer script within the temporary directory of the nano sandbox, the customer script utilizing the input variable, wherein the execution of the customer script results in writing to an output file in the nano sandbox;
copying an output from the output file to a location outside of the nano sandbox; and
destroying the nano sandbox.

20. A system for securely executing code blocks for artificial intelligence (AI) agents, the system comprising:
at least one physical non-transitory, computer-readable medium including instructions; and
at least one processor that executes the instructions to perform stages comprising:
receiving, from a user device, an input associated with an AI agent;
executing the AI agent by an agent executor, wherein the AI agent includes a code block for executing a customer script;
creating a nano sandbox for executing the customer script of the code block, including:
binding system resources as read-only to the nano sandbox;
binding a temporary directory to the nano sandbox; and
defining network access within the nano sandbox;
seeding an input variable within the nano sandbox for use with the customer script;

executing the customer script within the temporary directory of the nano sandbox, the customer script utilizing the input variable, wherein the execution of the customer script results in writing to an output file in the nano sandbox;
copying an output from the output file to a location outside of the nano sandbox; and
destroying the nano sandbox.

* * * * *